US010708065B2

(12) United States Patent
Lu et al.

(10) Patent No.: US 10,708,065 B2
(45) Date of Patent: Jul. 7, 2020

(54) SERVICE PROCESSING METHOD, DEVICE AND SYSTEM

(71) Applicant: TENCENT TECHNOLOGY (SHENZHEN) COMPANY LIMITED, Shenzhen, Guangdong (CN)

(72) Inventors: Qiang Lu, Shenzhen (CN); Xuan Ye, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 200 days.

(21) Appl. No.: 15/960,934

(22) Filed: Apr. 24, 2018

(65) Prior Publication Data

US 2018/0241571 A1 Aug. 23, 2018

Related U.S. Application Data

(63) Continuation of application No. PCT/CN2017/070614, filed on Jan. 9, 2017.

(30) Foreign Application Priority Data

Jan. 8, 2016 (CN) .......................... 2016 1 0015498

(51) Int. Cl.
*H04L 29/06* (2006.01)
*H04L 9/32* (2006.01)
(Continued)

(52) U.S. Cl.
CPC ............ *H04L 9/3247* (2013.01); *G06F 21/32* (2013.01); *G06F 21/57* (2013.01);
(Continued)

(58) Field of Classification Search
CPC . H04L 9/3247; H04L 9/0894; H04L 63/0861; H04L 9/3231; H04L 9/30;
(Continued)

(56) References Cited

U.S. PATENT DOCUMENTS

2006/0190526 A1 8/2006 Neil et al.
2010/0088519 A1* 4/2010 Tsuruoka ................ G06F 21/33
713/176

(Continued)

FOREIGN PATENT DOCUMENTS

CN 101867877 A 10/2010
CN 102075859 A 5/2011
(Continued)

OTHER PUBLICATIONS

Office Action with Translation Issued for Japanese Patent Application No. 2018-520519 dated May 7, 2019 in 6 pages.
(Continued)

*Primary Examiner* — Trong H Nguyen
(74) *Attorney, Agent, or Firm* — Knobbe, Martens, Olson & Bear, LLP

(57) ABSTRACT

The present disclosure relates to a service processing method, a service processing device and a service processing system, which belong to computer technologies. The method includes: a service execution request is transmitted to a service server; a verification notification carrying signature information is received from the service server; currently inputted biometric feature information is verified through a Trusted Execution Environment (TEE) system, when biometric feature information is consistent with pre-stored reference biometric feature information, a signature processing is performed on signature information, by using a pre-stored service private key, first to-be-verified signature information is obtained; and a verification request carrying first to-be-verified signature information is transmitted to the service server. By adopting the present disclosure, security may be enhanced.

13 Claims, 10 Drawing Sheets

(51) Int. Cl.
  G06F 21/32        (2013.01)
  G06F 21/57        (2013.01)
  H04L 9/08         (2006.01)
  G06Q 20/32        (2012.01)
  G06Q 20/38        (2012.01)
  G06Q 20/40        (2012.01)
  H04L 9/14         (2006.01)
  H04L 9/30         (2006.01)

(52) U.S. Cl.
  CPC ..... *G06Q 20/3226* (2013.01); *G06Q 20/3227* (2013.01); *G06Q 20/3825* (2013.01); *G06Q 20/3829* (2013.01); *G06Q 20/40145* (2013.01); *H04L 9/0894* (2013.01); *H04L 9/14* (2013.01); *H04L 9/30* (2013.01); *H04L 9/3231* (2013.01); *H04L 63/0861* (2013.01); *G06Q 2220/00* (2013.01)

(58) Field of Classification Search
  CPC ......... H04L 9/14; H04L 9/083; H04L 9/0825; G06F 21/57; G06F 21/32; G06Q 20/40145; G06Q 20/3829; G06Q 20/3825; G06Q 20/3227; G06Q 20/40975
  See application file for complete search history.

(56) References Cited

U.S. PATENT DOCUMENTS

| | | | |
|---|---|---|---|
| 2010/0250944 A1 | 9/2010 | Suzuki | |
| 2010/0287369 A1* | 11/2010 | Monden | G06F 21/32 713/156 |
| 2012/0033605 A1 | 2/2012 | Yang et al. | |
| 2015/0288776 A1 | 10/2015 | Huang et al. | |
| 2015/0381369 A1* | 12/2015 | Broumas | H04L 9/3228 713/176 |

FOREIGN PATENT DOCUMENTS

| | | |
|---|---|---|
| CN | 102724324 A | 10/2012 |
| CN | 103067247 A | 4/2013 |
| CN | 103902616 A | 7/2014 |
| CN | 103957107 A | 7/2014 |
| CN | 104660417 A | 5/2015 |
| CN | 105704123 A | 6/2016 |
| KR | 10-2016-0000875 | 1/2016 |
| WO | WO 02/073877 A2 | 9/2002 |
| WO | WO 2007/094165 A1 | 8/2007 |
| WO | WO 2017/118437 A1 | 7/2017 |

OTHER PUBLICATIONS

Extended European Search Report for Application No. 17735875.1 dated Oct. 15, 2018.
International Preliminary Report on Patentability for International Application No. PCT/CN2017/070614 dated Jul. 10, 2018.
International Search Report with Translation for International Application No. PCT/CN2017/070614 dated Mar. 30, 2017.
Office Action Issued for Chinese Application No. 201610015498.8 dated Mar. 22, 2017.
Office Action with translation in Korean Patent Application No. 10-2018-7012122 dated Nov. 6, 2019 in 11 pages.

* cited by examiner

SERVICE PROCESSING METHOD, DEVICE AND SYSTEM

CROSS-REFERENCE TO RELATED APPLICATIONS

This application is a continuation of International Application No. PCT/CN2017/070614, filed Jan. 9, 2017, which claims the benefit and priority of Chinese Patent Application No. 201610015498.8, filed Jan. 8, 2016. The entire disclosures of each of the above-recited applications are hereby incorporated by reference in their entireties.

TECHNICAL FIELD

The present disclosure relates to computer technologies, and more particularly, to a service processing method, a service processing device and a service processing system.

BACKGROUND

Accompanying with the development of computer technologies, applications of mobile terminals, such as, mobile phone, tablet, become more and more widely, there are more and more types of application programs on a corresponding terminal, and functions thereof become more sufficient. Versatility of a terminal brings a great convenience to people's lives, e.g., people may make a quick payment by using a mobile phone. To ensure safety, a user often sets a password for some functions of a mobile phone. The password may be biometric information (such as, fingerprint information). For example, when making a payment by using a mobile phone, the payment may be successfully made only after verification of fingerprint information is passed.

SUMMARY

The present disclosure provides a service processing method, a service processing device and a service processing system. The technical solutions are as follows.

From one aspect, the present disclosure provides a service processing method, including:
  transmitting a service execution request to a service server;
  receiving a verification notification carrying signature information from the service server in correspondence with the service execution request;
  verifying currently inputted biometric feature information through a Trusted Execution Environment (TEE) system, when the biometric feature information is consistent with pre-stored reference biometric feature information, performing a signature processing on the signature information, by using a pre-stored service private key, and obtaining first to-be-verified signature information; and,
  transmitting a verification request carrying the first to-be-verified signature information to the service server.

From another aspect, the present disclosure provides a service processing method, including:
  receiving a service execution request from a terminal;
  transmitting a verification notification carrying signature information to the terminal according to the service execution request, to cause the terminal generating first to-be-verified signature information;
  when receiving a verification request carrying the first to-be-verified signature information from the terminal, performing a verification processing on the first to-be-verified signature information based on a pre-stored service public key and the signature information; and
  when the verification processing is successful, performing a service processing corresponding to the service execution request.

From the other aspect, the present disclosure provides a terminal, including a processor and a memory, wherein the memory stores instructions that, when being executed by the processor, cause the processor to:
  transmit a service execution request to a service server;
  receive a verification notification carrying signature information from the service server in correspondence with the service execution request;
  verify currently inputted biometric feature information through a TEE system, when the biometric feature information is consistent with pre-stored reference biometric feature information, perform a signature processing on the signature information by using a pre-stored service private key, and obtain first to-be-verified signature information; and,
  transmit a verification request carrying the first to-be-verified signature information to the service server.

DETAILED DESCRIPTION

It should be understood that, specific examples described here are only for use in explaining the present disclosure, which are not for use in limiting the present disclosure.

In some examples, when making a payment by using an application program of a terminal, a user firstly pre-stores reference fingerprint information into the terminal. When payment is required, the terminal obtains fingerprint information of the user, and determines whether the obtained fingerprint information is consistent with the stored reference fingerprint information. If they are consistent, the terminal transmits a verification success result to a service server. And then, the service server completes payment processes, based on the verification success result transmitted by the terminal.

During the process of implementing the present disclosure, the inventor finds that at least the following problems exist in foregoing examples.

Based on the foregoing processing mode, the service server fully trusts the verification success result transmitted by the terminal. When being cracked by a hacker, the terminal may transmit the verification success result to the service server without a biometric verification, which leads to a lower security.

The present disclosure provides a service processing method, which is implemented by a terminal and a service server. The terminal may process a biometric identification function, which may be a mobile terminal, such as, a mobile phone, a tablet. The service server may be a server, which is configured to perform a service processing, e.g., a server for use in an online payment processing. The terminal may be configured with a processor, a memory and a transceiver. The processor may perform a relevant processing, e.g., perform a signature processing on signature information. The memory may be configured to store data, which is needed and generated by the following processing procedure. The transceiver may be configured to receive and transmit data. The terminal may further be configured with a biometric identification component. The biometric identification component may be configured to detect currently imputed biometric feature information. The service server may be configured with a processor, a memory and a transceiver. The processor may perform a signature-verification processing on signature information to be verified, which is transmitted by the terminal, determine whether to perform a processing on a service, which corresponds to a service execution request, and perform relevant service processing, when the signature-verification processing is successful. The memory is configured to store data, which is needed and generated in the following processing procedure. The transceiver may be configured to receive and transmit data.

Figure 1A:
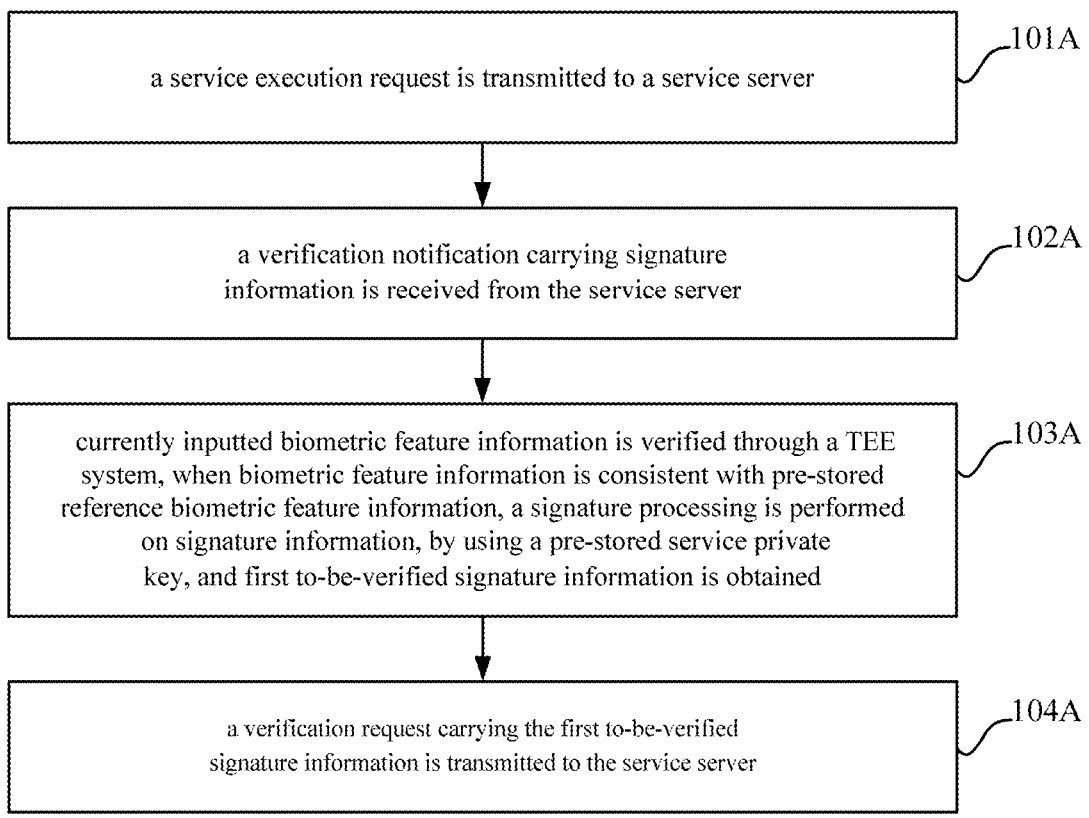
FIGS. 1A-B illustrate flowcharts for a service processing method, in accordance with an embodiment of the present disclosure.

The service processing method put forward by the present disclosure may be applied to a terminal side, as shown in FIG. 1A, which includes the following steps.

In step 101A, a service execution request is transmitted to a service server.

In step 102A, a verification notification carrying signature information is received from the service server.

In step 103A, currently inputted biometric feature information is verified by a Trusted Execution Environment (TEE) system of a terminal; when the biometric feature information is consistent with pre-stored reference biometric feature information, a pre-stored service private key is used to perform a signature processing on the signature information, and first to-be-verified signature information is obtained.

In step 104A, a verification request carrying the first to-be-verified signature information is transmitted to the service server.

Figure 1B:
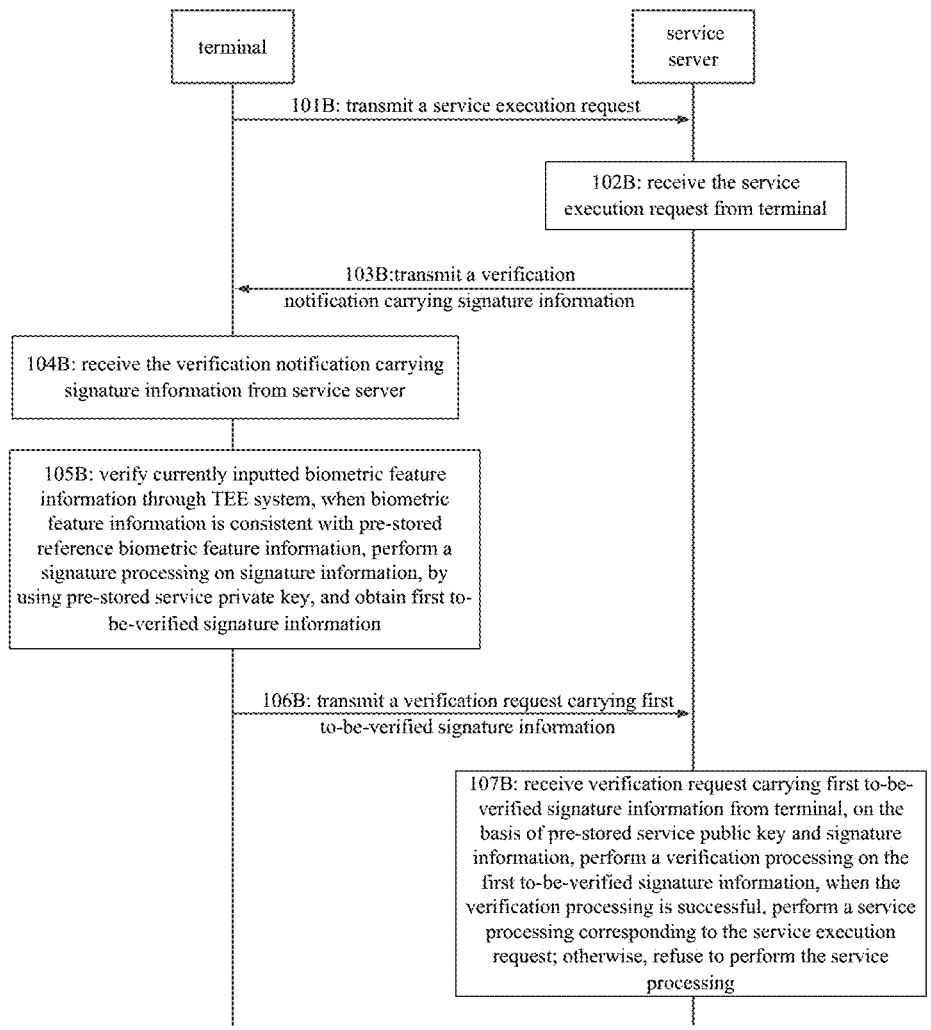

Detailed descriptions about processing procedure shown in FIG. 1B are provided in the following, accompanying with specific implementation modes.

In step 101B, a terminal transmits a service execution request to a service server.

The service server may be a server for processing services, which may be a background server of an application program with a certain service processing function in the terminal. For example, the service server may be a background server of WeChat.

Figure 2:
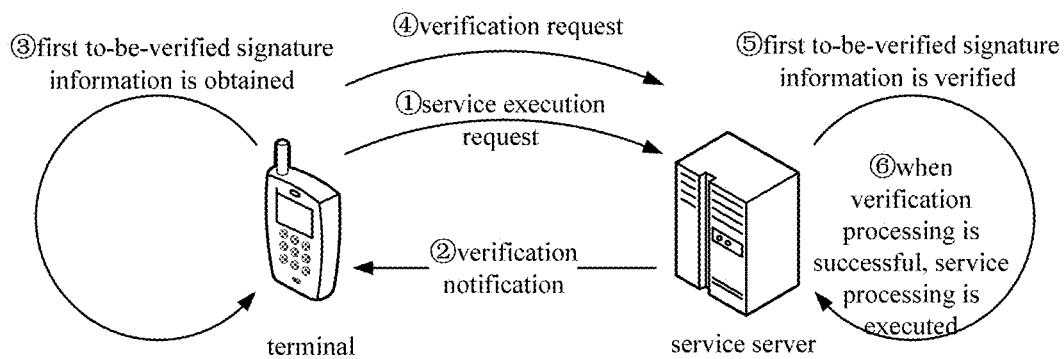
FIG. 2 is a schematic diagram illustrating a structure of a system, in accordance with an embodiment of the present disclosure.

In some examples, the terminal may be installed with an application program for implementing a certain service processing. For example, the terminal may be installed with an application (e.g., WeChat) for implementing online payment processing. When wishing to implement the service processing by a terminal, a user may trigger the terminal to transmit a service execution request to the service server, as shown in FIG. 2.

In step 102B, the service server receives the service execution request from the terminal.

Here, after the terminal transmits the service execution request to the service server, the service server may receive the service execution request from the terminal.

In step 103B, the service server transmits a verification notification carrying signature information to the terminal.

Here, after receiving the service execution request from the terminal, the service server may transmit the verification notification to the terminal. The verification notification may carry the signature information. The signature information may be information adopted by the terminal for performing signature processing, e.g., a character string, and so on.

In step 104B, the terminal receives the verification notification carrying signature information from the service server.

Here, after the service server transmits the verification notification carrying signature information to the terminal, the terminal may receive the verification notification from the service server, analyze the verification notification, and obtain the carried signature information.

In step 105B, the terminal verifies currently inputted biometric feature information by using the TEE system; when the currently inputted biometric feature information is consistent with pre-stored reference biometric feature information, the terminal adopts a pre-stored service private key to perform signature processing on signature information, and obtains first to-be-verified signature information.

The TEE system may be a system in a terminal, which is configured to verify biometric feature information and perform signature processing on signature information. Data stored and processed by the TEE system is safe. The TEE system is independent of the remaining systems (e.g., Android system) in the terminal. The reference biometric feature information may be information set by a user, e.g., fingerprint information, which is configured to verify service processing. For example, a user sets reference fingerprint information for WeChat payment in WeChat. The WeChat payment service may also be referred to as a fingerprint payment service.

Figure 3:
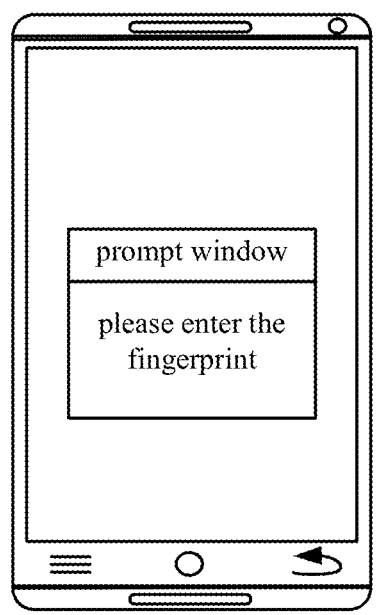
FIG. 3 is a schematic diagram illustrating an interface, in accordance with an embodiment of the present disclosure.

In some examples, after obtaining signature information by a terminal, as shown in FIG. 3, the terminal may be triggered to pop up a prompt window, which prompts a user that at this time biometric feature information may be inputted (e.g., the prompt window displays text information of please input fingerprint information). The user may input biometric feature information within a preset duration, by using a biometric identification component (e.g., a fingerprint identification sensor) in the terminal. At this time, the terminal will be triggered to verify, by using the TEE system, whether the biometric feature information currently inputted by the user is consistent with the pre-stored reference biometric feature information. When they are consistent, the terminal may perform signature processing on foregoing signature information, by using the service private key pre-stored by the TEE system, and obtain to-be-verified signature information (which may be referred to as first to-be-verified signature information). When they are not consistent, the terminal may not perform subsequent processing. In addition, when the user does not input the biometric feature information within the preset duration, that is, the terminal does not detect the biometric feature information within the preset duration, by using the biometric identification component, or within the preset duration, the terminal does not verify that the biometric feature information and pre-stored reference biometric feature information are consistent, the terminal may not perform subsequent processing.

In some examples, the terminal may further perform signature processing on biometric feature information ID. Correspondingly, the processing procedure may be as follows. Signature processing is performed on signature information and biometric feature information ID, by using the pre-stored service private key, and the first to-be-verified signature information is obtained.

In some examples, when a user inputs reference biometric feature information through a biometric identification component, for the inputted reference biometric feature information, a terminal may store a corresponding biometric feature information ID. There is a one-to-one correspondence between the biometric feature information ID and each piece of reference biometric feature information, which is stored by the terminal. When the user inputs reference biometric feature information for a certain function of an application program, the service server will correspondingly store the biometric feature information ID of reference biometric feature information, which corresponds to a function of an account logged on the terminal. For example, the user may input reference biometric feature information for WeChat payment function in WeChat. Correspondingly, the service server may store the biometric feature information ID of the reference biometric feature information, which is used for WeChat payment of an account (e.g., WeChat account) logged on the terminal. The terminal may verify currently inputted biometric feature information, by using the TEE system. When the biometric feature information and pre-stored reference biometric feature information are consistent, signature processing is performed on signature information transmitted by the server, and the biometric feature information ID corresponding to the currently inputted biometric feature information, by using the pre-stored service private key, and the first to-be-verified signature information is obtained.

In some examples, the terminal may perform signature processing on terminal associated security information. Correspondingly, the processing procedure may be as follows. Signature processing is performed on signature information, the biometric feature information ID and terminal associated security information, by using the pre-stored service private key, and the first to-be-verified signature information is obtained. The terminal associated security information includes at least one of a system ID, and a biometric identification component ID.

In some examples, the terminal verifies currently inputted biometric feature information, by using the TEE system. When the biometric feature information and pre-stored reference biometric feature information are consistent, signature processing is performed on signature information, the biometric feature information ID and terminal associated security information, and the first to-be-verified signature information is obtained. The terminal associated security information may involve safe information of the terminal, e.g., include at least one of a system ID, a biometric identification component ID. The system ID may be a type ID of a system. The biometric identification component ID may be a model identification of the biometric identification component, and so on.

In step 106B, the terminal transmits a verification request carrying the first to-be-verified signature information to the service server.

Here, after obtaining the first to-be-verified signature information, the terminal may transmit the verification request to the service server. The verification request may carry the first to-be-verified signature information.

In step 107B, when receiving the verification request carrying the first to-be-verified signature information from the terminal, the service server performs a verification processing on the first to-be-verified signature information, based on a pre-stored service public key and signature information. When the verification processing is successful, the service server performs a service processing corresponding to the service execution request; otherwise, the service server refuses to perform the service processing.

In some examples, after the terminal transmits the verification request carrying the first to-be-verified signature information to the service server, the service server may receive the verification request carrying the first to-be-verified signature information from the terminal. After receiving the verification request, the service server may analyze the verification request, obtain the first to-be-verified signature information carried by the verification request, and perform a verification processing on the first to-be-verified signature information, based on signature information and a pre-stored service public key corresponding to the service private key. Specifically, when the verification processing is successful, that is, when the first to-be-verified signature information is obtained by the terminal, after performing signature processing on signature information received from the service server by using the service private key, the service server may perform a service processing corresponding to the service execution request, which is transmitted by the terminal; otherwise, the service server may refuse to perform the service processing corresponding to the service execution request.

In some examples, in a case, where the terminal performs signature processing on signature information and biometric feature information ID, correspondingly, the processing procedure may be as follows. Based on the pre-stored service public key, signature information and biometric feature information ID, the verification processing is performed on the first to-be-verified signature information.

In some examples, in a case, where the terminal performs signature processing on signature information and biometric feature information ID, by using the service private key, when receiving the verification request carrying the first to-be-verified signature information from the terminal, the service server may perform the verification processing on the first to-be-verified signature information, based on the pre-stored service public key, signature information, and biometric feature information ID. Specifically, when the verification processing is successful, that is, when the first to-be-verified signature information is obtained by the terminal, after performing signature processing on signature information and biometric feature information ID by using the service private key, in which the signature information is transmitted by the service server, and the biometric feature information ID corresponds to an account logged on the terminal, the service server may perform a service processing corresponding to the service execution request, which is transmitted by the terminal; otherwise, the service server may refuse to perform the service processing corresponding to the service execution request.

In some examples, in a case, where the terminal performs signature processing on signature information, biometric feature information ID, and terminal associated security information, correspondingly, the processing procedure may be as follows. Based on the pre-stored service public key, signature information, biometric feature information ID, and terminal associated security information, verification processing is performed on the first to-be-verified signature information. The terminal associated security information includes at least one of a system ID, a biometric identification component ID.

In some examples, in a case, where the terminal performs signature processing on signature information, biometric feature information ID, and terminal associated security information, by using the service private key, when receiving the verification request carrying the first to-be-verified signature information from the terminal, the service server may perform the verification processing on the first to-be-verified signature information, based on the pre-stored service public key, signature information, biometric feature information ID and terminal associated security information. Specifically, when the verification processing is successful, that is, when the first to-be-verified signature information is obtained by the terminal, after performing signature processing on signature information, biometric feature information ID and terminal associated security information by using the service private key, in which the signature information is transmitted by the service server, and the biometric feature information ID corresponds to an account logged on the terminal, the service server may perform the service processing corresponding to the service execution request transmitted by the terminal; otherwise, the service server may refuse to perform the service processing corresponding to the service execution request.

Figure 4:
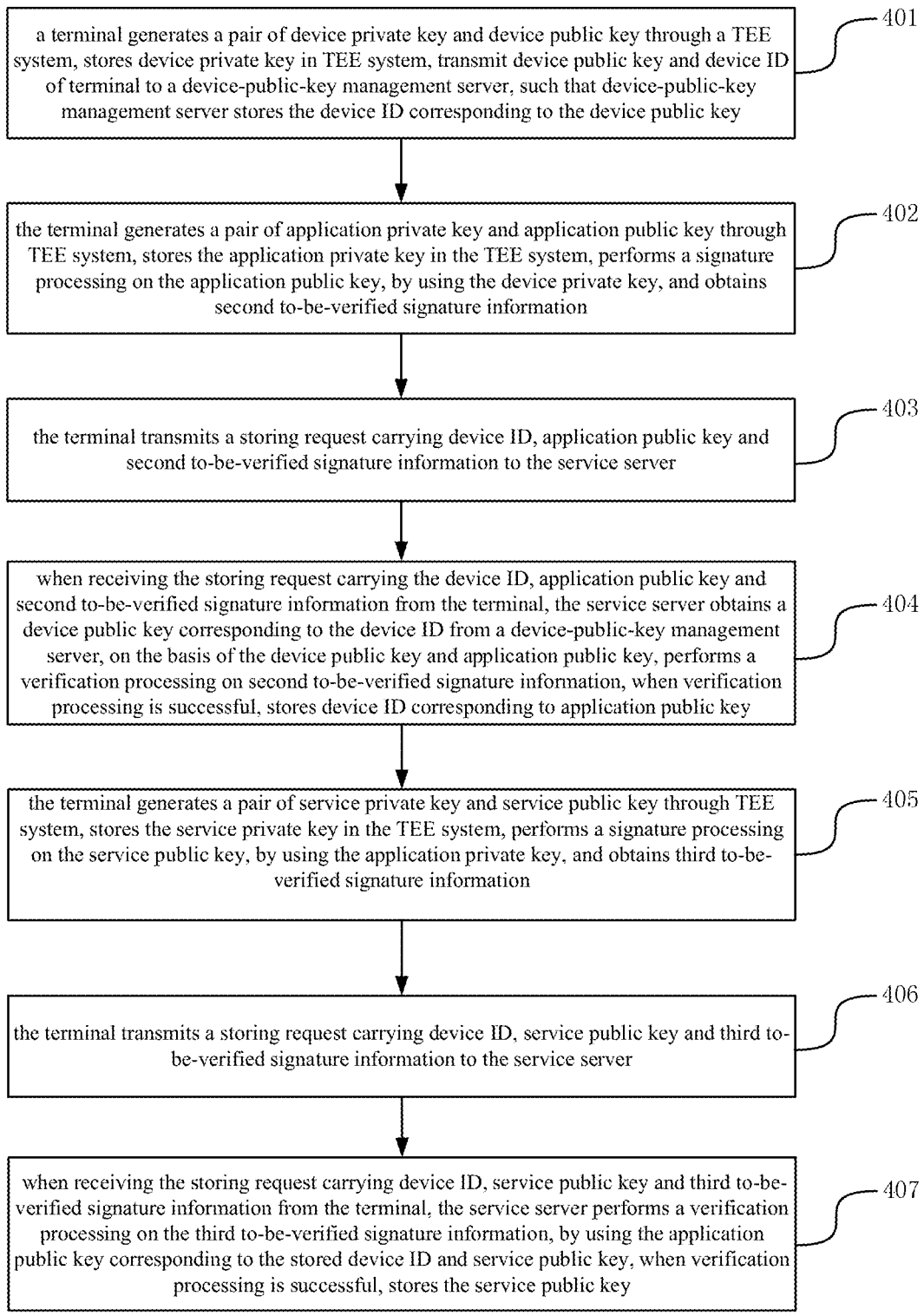
FIG. 4 is a flowchart illustrating a method for generating a service private key and a service public key, in accordance with an embodiment of the present disclosure.

The present disclosure also provides a method for generating a service private key and a service public key. As shown in FIG. 4, the method may be used for generating foregoing service private key and service public key. Detailed descriptions about the processing procedure in FIG. 4 will be provided in the following, accompanying with specific implementation modes. The contents may be as follows.

In step 401, a terminal generates a pair of device private key and device public key, by using a TEE system. The terminal stores the device private key into the TEE system, transmits the device public key and terminal ID of the terminal to a device-public-key management server, such that the device-public-key management server stores the terminal ID and the device public key correspondingly.

A device verification key includes a pair of device private key and device public key, which are used for verifying the legality of the terminal and are necessary for generating an application verification key. The device private key may be set within a security area of a terminal by a manufacturer, before the terminal leaves the factory. The device public key is stored in the device-public-key management server. One terminal only possesses one device verification key.

In some examples, a terminal may generate a device verification key (which may be referred to as a root key) through a TEE system, that is, the terminal generates a pair of device private key and device public key. Before the terminal leaves a factory, a pair of device private key and device public key are generated by a TEE system in the terminal, based on hardware information of the terminal and a preset algorithm. A different terminal corresponds to a different device private key and a different device public key. After generating a pair of device private key and device public key, the generated device private key may be stored in the TEE system. The device verification key is stored in the security area. The remaining terminals do not learn the device private key stored in the security area, transmit the generated device public key and the terminal's device ID to the device-public-key management server. The device-public-key management server may be configured to store the device public key, which is generated by the terminal before the terminal leaves the factory. The device-public-key management server may receive the device public key and device ID from the terminal, further store the device ID and the device public key correspondingly.

In step 402, the terminal generates a pair of application private key and application public key by using the TEE system, stores the application private key into the TEE system, performs a signature processing on the application public key by using the device private key, and obtains second to-be-verified signature information.

The application verification key includes a pair of application private key and application public key, which are generated through an application program by using a preset algorithm. The application private key is stored in a security storage area. The application public key is stored in the service server. The application verification key may be used for verifying security and identity of an application program, which is a necessary key for generating a service verification key. One application program only possesses one application verification key. When an application verification key is generated repeatedly, previously generated application verification key is overwritten.

In some examples, after a terminal installs an application program (such as WeChat) for implementing a certain service processing, when firstly starting the application program, the terminal may generate an application verification key (which may also be referred to as secondary key) through the TEE system, that is, generate a pair of application private key and application public key. The pair of application private key and application public key may be generated by the TEE system in the terminal, based on hardware information of the terminal and a preset algorithm. The application program in the terminal corresponds to a pair of application private key and application public key, that is, the generated pair of application private key and application public key corresponds to the application program, and does not correspond to an account logged on the application program. After generating a pair of application private key and application public key, the application private key may be stored into the TEE system. A signature processing may be performed on the application public key, which is generated by using the device private key pre-stored in the terminal, and then, the to-be-verified signature information (which is also referred to as second to-be-verified signature information) is obtained.

In step 403, the terminal transmits a storing request to the service server, in which the storing request carries the device ID, the application public key and the second to-be-verified signature information.

In some examples, after obtaining the second to-be-verified signature information, the terminal may transmit the storing request to the service server. The storing request may carry the device ID, the application public key and the second to-be-verified signature information.

In step 404, when receiving the storing request with the device ID, the application public key and the second to-be-verified signature information from the terminal, the service server obtains the device public key corresponding to the device ID from the device-public-key management server, performs a verification processing on the second to-be-verified signature information, based on the device public key and the application public key. When the verification processing is successful, the service server stores the device ID corresponding to the application public key.

In some examples, after the terminal transmits the storing request with the device ID, the application public key and the second to-be-verified signature information to the service server, the service server may receive the storing request from the terminal, analyze the storing request, obtain the carried device ID, the application public key and the second to-be-verified signature information from the storing request. Furthermore, the service server may obtain the device public key from the device-public-key management server, in which the device public key corresponds to the device ID carried by the storing request. The service server may perform a verification processing on the second to-be-verified signature information, based on the obtained device public key and application public key, and determine whether the verification processing is successful. When the verification processing is successful, the service server may store the device ID corresponding to the application public key; otherwise, the service server may not store the device ID.

In step 405, the terminal generates a pair of service private key and service public key through the TEE system, stores the service private key in the TEE system, performs a signature processing on the service public key by using the application private key, and obtains third to-be-verified signature information.

The service verification key includes the service private key and the service public key, which are configured to verify legality of a specific service logic. The service private key is stored in a safe storage area. The service public key is stored in the service server. The number of the service verification key is not limited. A service side controls the generated number of the service verification key.

In some examples, an application program installed by a terminal may be used for implementing various service processes. Besides, a user has inputted biometric feature information for many kinds of services. That is, the user has performed signature processing on various services. Different services of an application program may correspond to different service verification keys. For example, for logon service and payment service of WeChat, processes of setting a fingerprint verification process by a user may be respectively referred to as a fingerprint logon service and a fingerprint payment service. These two kinds of services may correspond to different service verification keys, and correspond to the same application verification key (the application verification key includes an application private key and an application public key). When receiving a start instruction for a certain service in the application program, e.g., when a user starts a fingerprint payment service, a terminal will be triggered to receive the start instruction of the fingerprint payment service, and generate a service verification key (which may also generate a third level key) corresponding to the service, e.g., a pair of service private key and service public key, by using the TEE system in the terminal. The service private key corresponds to an account logged on the application program. A signature processing may be performed on the service public key, by using the pre-stored application private key, and then third to-be-verified signature information is obtained.

In step 406, the terminal transmits a storing request to the service server, in which the storing request carries the device ID, the service public key and the third to-be-verified signature information.

In some examples, after obtaining the third to-be-verified signature information, the terminal may transmit the storing request to the service server. The storing request may carry the device ID, the service public key and the third to-be-verified signature information.

In step 407, when receiving the storing request from the terminal, in which the storing request carries the device ID, the service public key and the third to-be-verified signature information, the service server performs a verification processing on the third to-be-verified signature information, based on the application public key and service public key corresponding to the stored device ID; when the verification processing is successful, the service server stores the service public key.

In some examples, after the terminal transmits the storing request to the service server, in which the storing request carries the device ID, the service public key and the third to-be-verified signature information, the service server may receive the storing request from the terminal, analyze the storing request, obtain the device ID, service public key and third to-be-verified signature information carried by the storing request. Furthermore, the service server may perform a verification processing on the third to-be-verified signature information, based on the application public key and service public key corresponding to the pre-stored device ID, and determine whether the verification processing is successful. If the verification processing is successful, the service server may store the service public key correspondingly. The storing request transmitted by the terminal may also carry an account ID. The service server may store the device ID, the account ID and the service public key correspondingly.

Figure 5:
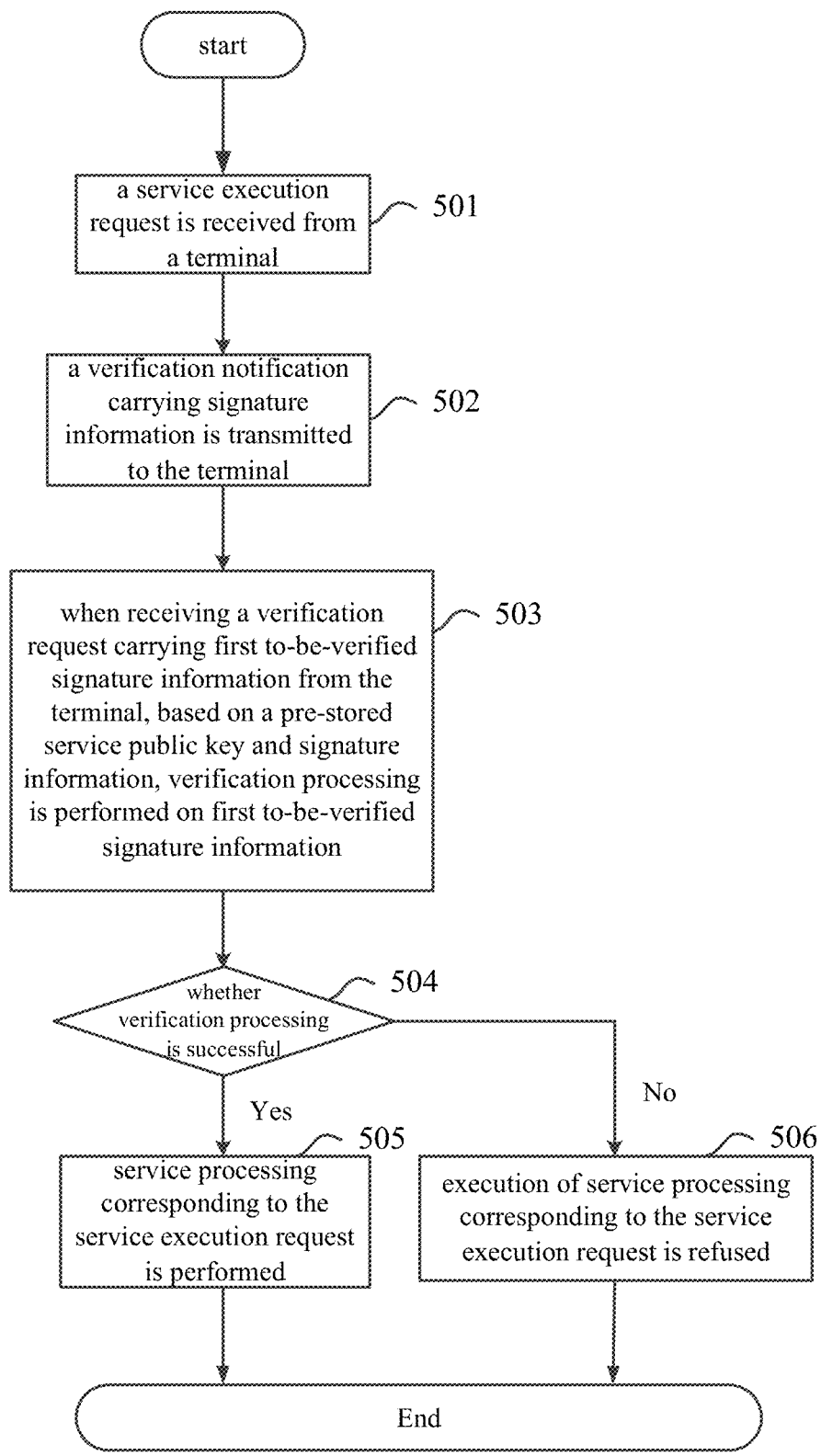
FIG. 5 is a flowchart illustrating a service processing method, in accordance with an embodiment of the present disclosure.

The present disclosure also provides a service processing method, which may be applied to a service server. As shown in FIG. 5, the method includes the following blocks.

In step 501, a service execution request transmitted by a terminal is received.

In step 502, a verification notification carrying signature information is transmitted to the terminal.

In step 503, when receiving a verification request carrying first to-be-verified signature information from the terminal, a verification processing is performed on the first to-be-verified signature information, based on a pre-stored service public key and signature information.

In step 504, it is determined that whether the verification processing is successful.

In step 505, when the verification processing is successful, a service processing corresponding to the service execution request is performed, and current flow is terminated.

In step 506, when the verification processing is failed, it is refused to perform the service processing, and current flow is terminated.

Figure 6:
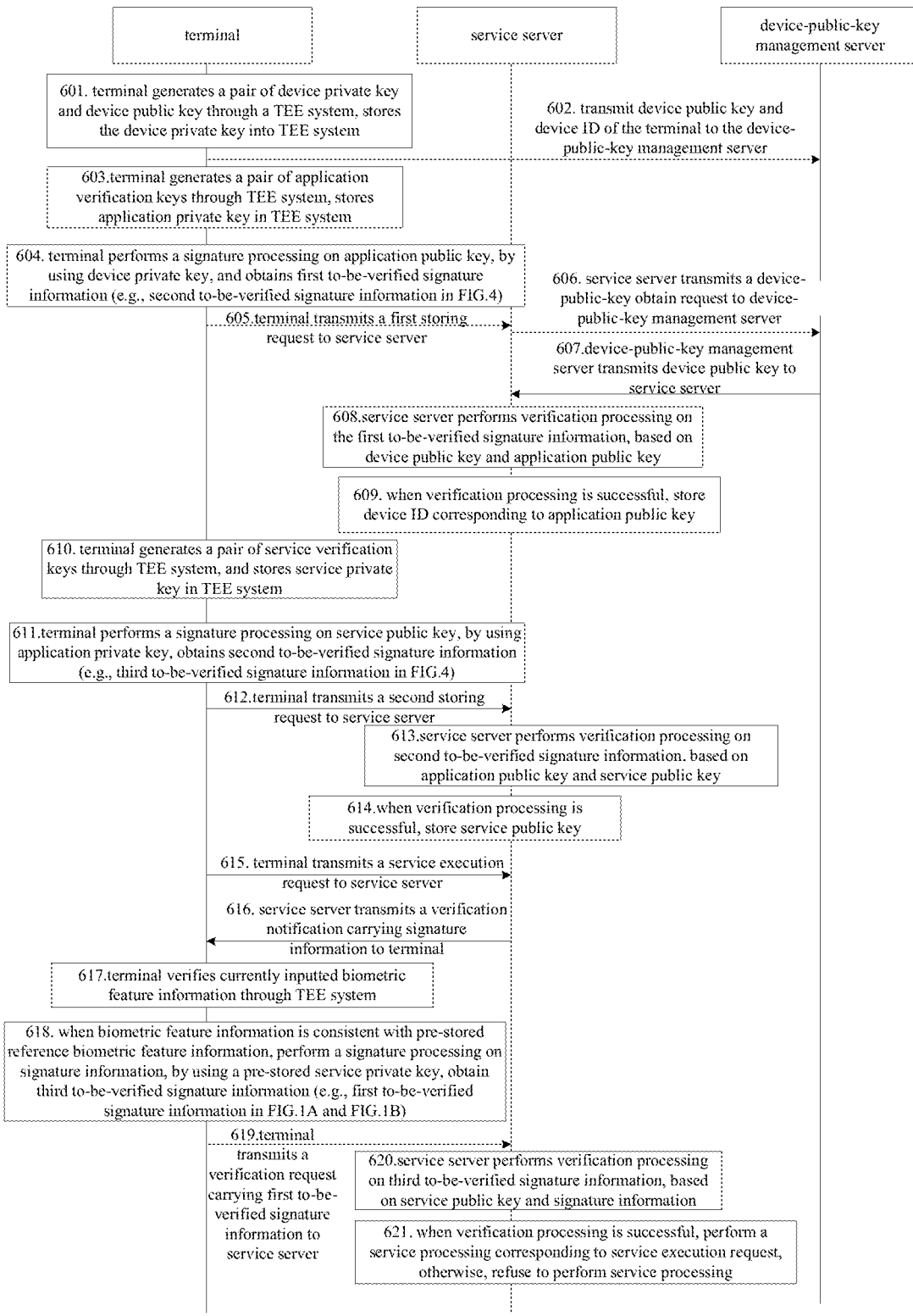
FIG. 6 is an overall flowchart, in accordance with an embodiment of the present disclosure.

The present disclosure also provides a whole flow for generating and using a service verification key, which is shown in FIG. 6. Specific operations of the whole flow may refer to foregoing blocks 101B-107B and blocks 401-407.

In step 601, a terminal generates a pair of device private key and device public key through a TEE system, and stores the device private key in the TEE system.

In step 602, the device public key and a device ID of the terminal are transmitted to a device-public-key management server.

In step 603, the terminal generates a pair of application verification keys through the TEE system, and stores an application private key in the TEE system.

In step 604, the terminal performs a signature processing on the application public key, by using the device private key, and obtains first to-be-verified signature information (such as, the second to-be-verified signature information in FIG. 4).

In step 605, the terminal transmits a first storing request to a service server, in which the first storing request carries the device ID, the application public key and the first to-be-verified signature information.

In step 606, the service server transmits a request for obtaining the device public key to the device-public-key management server.

In step 607, the device-public-key management server transmits the device public key to the service server.

In step 608, the service server performs a verification processing on the first to-be-verified signature information, based on the device public key and application public key.

In step 609, when the verification processing is successful, the service server stores the device ID corresponding to the application public key.

In step 610, the terminal generates a pair of service verification keys through the TEE system, and stores the service private key in the TEE system.

In step 611, the terminal performs a signature processing on the service public key, by using the application private key, and obtains second to-be-verified signature information (such as, third to-be-verified signature information in FIG. 4).

In step 612, the terminal transmits a second storing request to the service server, in which the second storing request carries the device ID, the service public key and the second to-be-verified signature information.

In step 613, the service server performs a verification processing on the second to-be-verified signature information, based on the application public key and service public key.

In step 614, when the verification processing is successful, the service server stores the service public key.

In step 615, the terminal transmits a service execution request to the service server.

In step 616, the service server transmits a verification notification carrying signature information to the terminal.

In step 617, the terminal verifies currently inputted biometric feature information through the TEE system.

In step 618, when the biometric feature information is consistent with pre-stored reference biometric feature information, the terminal performs a signature processing on the signature information, by using the pre-stored service private key, and obtains third to-be-verified signature information (such as, the first to-be-verified signature information in FIG. 1A and FIG. 1B).

In step 619, the terminal transmits a verification request carrying the third to-be-verified signature information to the service server.

In step 620, the service server performs a verification processing on the third to-be-verified signature information, based on the pre-stored service public key and signature information.

In step 621, when the verification processing is successful, the service server performs a service processing corresponding to the service execution request; otherwise, refuses to perform the service processing.

In the example, the service execution request is transmitted to the service server. The verification notification carrying signature information is received from the service server. Currently inputted biometric feature information is verified, by using the TEE system. When the biometric feature information is consistent with the pre-stored reference biometric feature information, a signature processing is performed on the signature information, by using the pre-stored service private key, and obtains the third to-be-verified signature information. The verification request carrying the third to-be-verified signature information is transmitted to the service server. The service execution request is received from the terminal. The verification notification carrying signature information is transmitted to the terminal. When receiving the verification request carrying the third to-be-verified signature information from the terminal, a verification processing is performed on the third to-be-verified signature information, based on pre-stored service public key and signature information. When the verification processing is successful, the service processing corresponding to the service execution request is performed; otherwise, execution of the service processing is refused. Thus, after the verification processing for the to-be-verified signature information is passed, in which the to-be-verified signature information is obtained after the terminal performs signature processing by using the service private key, the service server may process the service. However, even if the terminal is cracked by a hacker, the hacker cannot learn the service private key, which is stored by the terminal in the TEE system, so as to enhance security.

Figure 7:
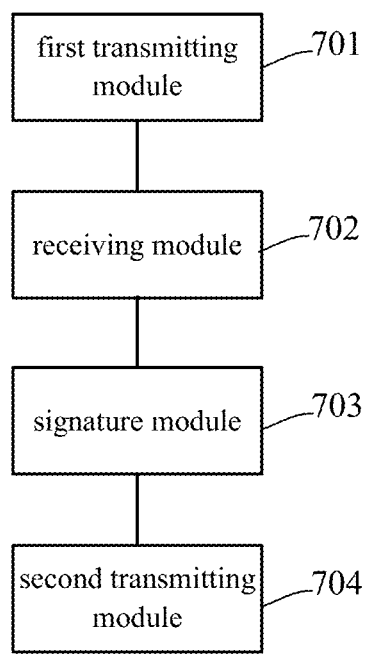
FIG. 7 is a schematic diagram illustrating a structure of a terminal, in accordance with an embodiment of the present disclosure.

Based on the same technical concept, the present disclosure also provides a terminal. As shown in FIG. 7, the terminal includes the following modules.

A first transmitting module 710 is configured to transmit a service execution request to a service server.

A receiving module 720 is configured to receive a verification notification carrying signature information from the service server.

A signature module 730 is configured to verify currently inputted biometric feature information through a TEE system, when the biometric feature information is consistent with pre-stored reference biometric feature information, the signature module 730 is further configured to perform a signature processing on the signature information, by using a pre-stored service private key, and obtain first to-be-verified signature information.

A second transmitting module 740 is configured to transmit a verification request to the service server, in which the verification request carries the first to-be-verified signature information.

Figure 8:
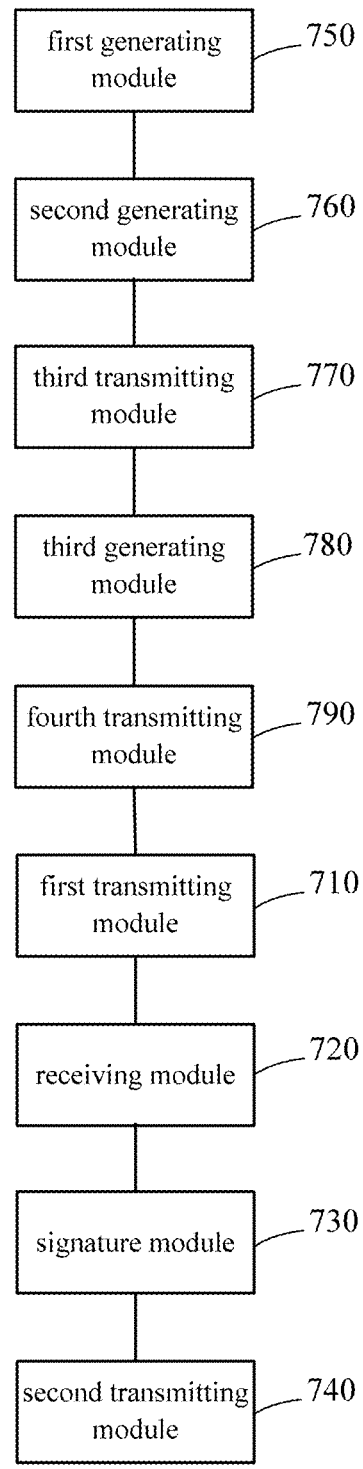
FIG. 8 is a schematic diagram illustrating a structure of a terminal, in accordance with an embodiment of the present disclosure.

In some examples, as shown in FIG. 8, the terminal further includes the following modules.

A first generating module 750 is configured to generate a pair of device private key and device public key through the TEE system, store the device private key into the TEE system, transmit the device public key and device ID of the terminal to a device-public-key management server, such that the device-public-key management server stores the device ID corresponding to the device public key.

A second generating module 760 is configured to generate a pair of application private key and application public key through the TEE system, store the application private key in the TEE system, perform a signature processing on the application public key by using the device private key, and obtain second to-be-verified signature information.

A third transmitting module 770 is configured to transmit a storing request to the service server, in which the storing request carries the device ID, the application public key and the second to-be-verified signature information.

A third generating module 780 is configured to generate a pair of service private key and service public key through the TEE system, store the service private key in the TEE system, perform the signature processing on the service public key by using the application private key, and obtain third to-be-verified signature information.

A fourth transmitting module 790 is configured to transmit a storing request to the service server, in which the storing request carries the device ID, the service public key and the third to-be-verified signature information.

In some examples, the signature module 730 is further configured to perform a signature processing on the signature information and biometric feature information, by using the pre-stored service private key, and obtain the first to-be-verified signature information.

In some examples, the signature module 730 is further configured to perform the signature processing on the signature information, a biometric feature information ID and terminal associated security information, by using the pre-stored service private key, and obtain the first to-be-verified signature information. The terminal associated security information includes at least one of a system ID, a biometric identification component ID.

Figure 9:
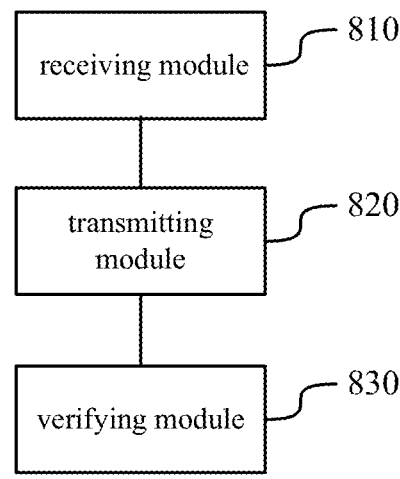
FIG. 9 is a schematic diagram illustrating a structure of a service server, in accordance with an embodiment of the present disclosure.

Based on the same technical concept, the present disclosure also provides a service server. As shown in FIG. 9, the service server includes the following modules.

A receiving module 810 is configured to receive a service execution request from a terminal.

A transmitting module 820 is configured to transmit a verification notification carrying signature information to the terminal.

When receiving a verification request carrying first to-be-verified signature information from the terminal, a verifying module 830 is configured to perform a verification processing on the first to-be-verified signature information, based on a pre-stored service public key and signature information. When the verification processing is successful, the verifying module 830 is further configured to execute a service processing corresponding to the service execution request; otherwise, refuse to perform the service processing.

In some examples, when receiving a storing request carrying the device ID, application public key and second to-be-verified signature information from the terminal, the verifying module 830 is further configured to obtain a device public key corresponding to the device ID from a device-public-key management server, perform a verification processing on the second to-be-verified signature information, based on the device public key and application public key, when the verification processing is successful, the verifying module 830 is further configured to store the device ID corresponding to the application public key.

When receiving a storing request carrying the device ID, the service public key and third to-be-verified signature information from the terminal, the verifying module 830 is further configured to perform a verification processing on the third to-be-verified signature information, based on the application public key and service public key corresponding to the stored device ID. When the verification processing is successful, the verifying module 830 is further configured to store the service public key.

In some examples, the verifying module 830 is further configured to perform a verification processing on the first to-be-verified signature information, based on the pre-stored service public key, signature information and biometric feature information ID.

In some examples, the verifying module 830 is further configured to perform a verification processing on the first to-be-verified signature information, based on the pre-stored service public key, signature information, biometric feature information ID and terminal associated security information. The terminal associated security information includes at least one of a system ID, a biometric identification component ID.

In the examples of the present disclosure, the service execution request is transmitted to the service server. The verification notification carrying signature information is received from the service server. Currently inputted biometric feature information is verified by the TEE system. When the biometric feature information is consistent with pre-stored reference biometric feature information, signature processing is performed on the signature information, by using the pre-stored service private key, and the first to-be-verified signature information is obtained. The verification request carrying the first to-be-verified signature information is transmitted to the service server. The service execution request is received from the terminal. The verification notification carrying signature information is transmitted to the terminal. When receiving the verification request carrying the first to-be-verified signature information from the terminal, a verification processing is performed on the first to-be-verified signature information, based on the pre-stored service public key and signature information. When the verification processing is successful, the service processing corresponding to the service execution request is performed; otherwise, execution of the service processing is refused. Thus, after the verification processing for the to-be-verified signature information is passed, in which the to-be-verified signature information is obtained after the terminal performs signature processing by using the service private key, the service server may process the service. However, even if a hacker has cracked the terminal, the hacker does not learn the service private key of the terminal stored in the TEE system, thereby enhancing security.

Based on the same technical concept, the present disclosure also provides a service processing system. The system includes a service server and a terminal.

The terminal is configured to transmit a service execution request to the service server, receive a verification notification carrying signature information from the service server; verify currently inputted biometric feature information through the TEE system; when the biometric feature information is consistent with pre-stored reference biometric feature information, perform a signature processing on the signature information, by using a pre-stored service private key, obtain first to-be-verified signature information, and transmit a verification request carrying the first to-be-verified signature information to the service server.

The service server is configured to receive the service execution request from the terminal, transmit the verification notification carrying signature information to the terminal; when receiving the verification request carrying the first to-be-verified signature information from the terminal, based on pre-stored service public key and signature information, perform a verification processing on the first to-be-verified signature information; when the verification processing is successful, perform a service processing corresponding to the service execution request, otherwise, refuse to perform the service processing.

In the examples of the present disclosure, the service execution request is transmitted to the service server. The verification notification carrying signature information is received from the service server. Currently inputted biometric feature information is verified through the TEE system. When the biometric feature information is consistent with pre-stored reference biometric feature information, signature processing is performed on the signature information, by using pre-stored service private key, and the first to-be-verified signature information is obtained. Subsequently, the verification request carrying the first to-be-verified signature information is transmitted to the service server. The service execution request is received from the terminal. The verification notification carrying signature information is transmitted to the terminal. When receiving the verification request carrying the first to-be-verified signature information from the terminal, based on the pre-stored service public key and signature information, verification processing is performed on the first to-be-verified signature information. When the verification processing is successful, service processing corresponding to the service execution request is performed; otherwise, execution of the service processing is refused. Thus, after the verification processing for the to-be-verified signature information is passed, in which the to-be-verified signature information is obtained after the terminal performs signature processing by using the service private key, the service server may process the service. However, even if the terminal is cracked by a hacker, the hacker cannot learn the service private key, which is stored in the TEE system by the terminal, thereby enhancing security.

Figure 10:
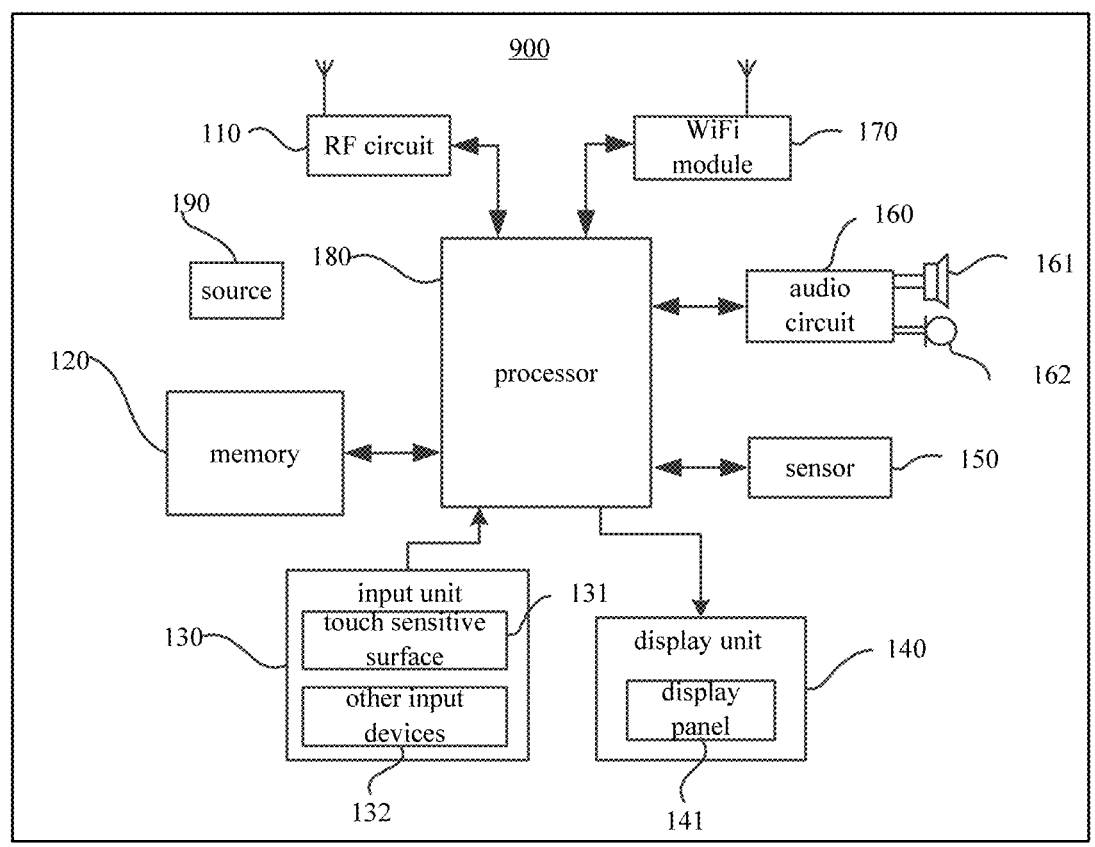
FIG. 10 is a schematic diagram illustrating a structure of a terminal, in accordance with an embodiment of the present disclosure.
Figure 11:
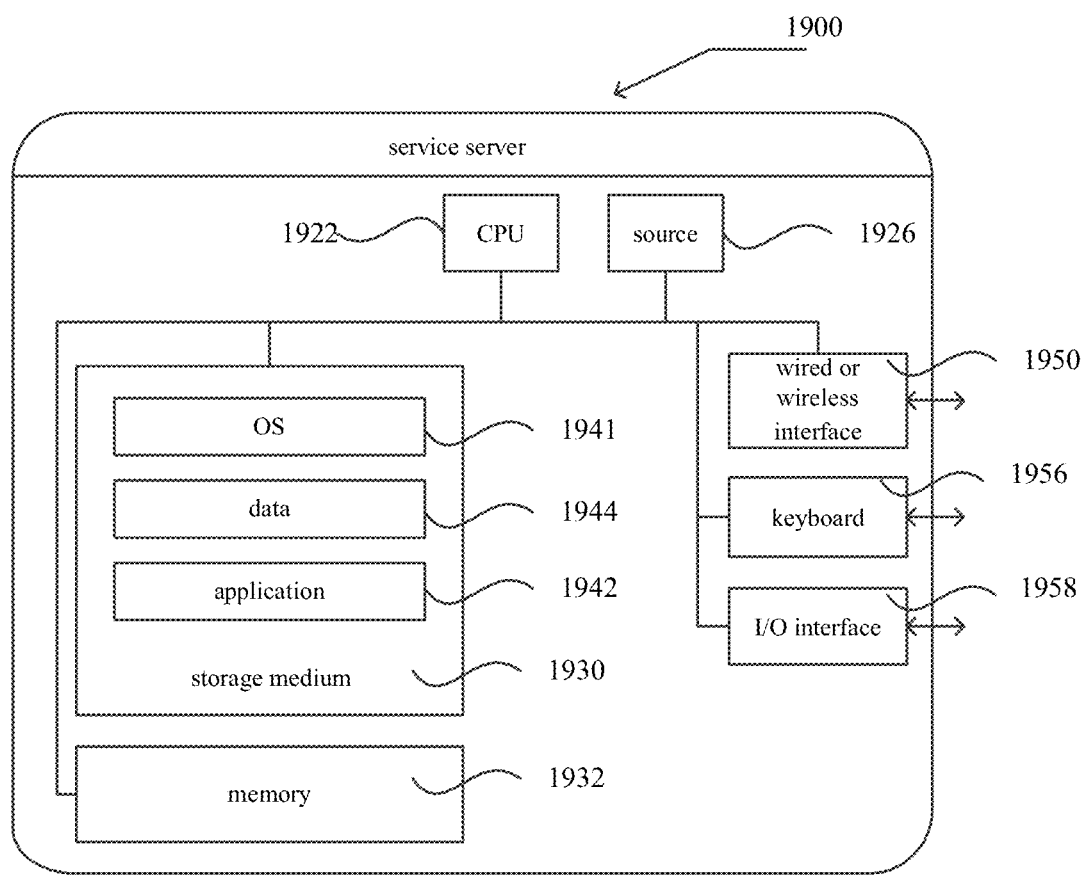
FIG. 11 is a schematic diagram illustrating a structure of a service server, in accordance with an embodiment of the present disclosure.

The present disclosure also provides a terminal. Please refer to FIG. 10. FIG. 10 is a schematic diagram illustrating a structure of a terminal with a touch sensitive surface, in accordance with an example of the present disclosure. The terminal may be configured to implement the service processing method, which is provided by foregoing example.

The terminal 900 may include a Radio Frequency (RF) circuit 110, one or more memories 120 of computer readable storage medium, an input unit 130, a display unit 140, a sensor 150, an audio circuit 160, a wireless fidelity (WiFi) module 170, one or more processors 180 as processing core, a source 190, and so on. Persons having ordinary skill in the art may understand that, the terminal is not limited by the structure shown in FIG. 10. The terminal may include more or less components, or combine some components, or have different component deployments.

The RF circuit 110 may be configured to receive and transmit a signal, during the process of transmitting and receiving information and calling. More particularly, after receiving downlink information from a BS, the RF circuit 110 submits the received downlink information to one or more processors 180 to be processed. In addition, the RF circuit 110 is further configured to transmit uplink related data to the BS. Generally, the RF circuit 110 includes, but is not limited to, antenna, at least one amplifier, tuner, one or more oscillators, a Subscriber Identification Module (SIM) card, a transceiver, a coupler, a Low Noise Amplifier (LNA), a duplexer, and so on. In addition, the RF circuit 110 is further configured to communicate with another device through a network by using wireless communication. The wireless communication may adopt any communication standard or protocol, including, but is not limited to, a Global System of Mobile communication (GSM), a General Packet Radio Service (GPRS), a Code Division Multiple Access (CDMA), a Wideband Code Division Multiple Access (WCDMA), a Long Term Evolution (LTE), an e-mail, a Short Messaging Service (SMS), and so on.

The memory 120 may be configured to store software programs and modules. By running the software programs and modules stored in the memory 120, the processor 180 executes each functional application, and data processing. The memory 120 may mainly include a storage program area and a storage data area. The storage program area may store an Operating System (OS), an application program (such as, sound playback function, image playback function, and so on) needed by at least one function. The storage data area may store data (such as, audio data, phonebook), which is created based on usage of the terminal 900. In addition, the memory 120 may further include a high-speed Random Access Memory (RAM), a non-transitory memory, e.g., at least one disk storage device, a flash device, or another transitory solid-state storage device. Correspondingly, the memory 120 may also include a memory controller, so as to provide access to the memory 120 for the processor 180 and input unit 130.

The input unit 130 may be configured to receive an inputted number or character information, and generate a signal input of keyboard, mouse, joystick, optical or trackball, which is relevant with user setting and function control. Specifically, the input unit 130 may include a touch sensitive surface 131, and another input device 132. The touch sensitive surface 131, which may be referred to as a touch screen or touchpad, may collect a touch operation (such as, a user adopts any appropriate object or attachment, e.g., a finger or touchpen, and perform an operation on or around the touch sensitive surface 131) of a user on or around the touch sensitive surface, and drive a corresponding connection device according to a preset program. In some examples, the touch sensitive surface 131 may include two parts of a touch detecting device, and a touch controller. The touch detecting device is configured to detect a touch orientation of the user, detect a signal brought by the touch operation, and transmit the signal to the touch controller. The touch controller is configured to receive touch information from the touch detecting device, convert the touch information into contact coordinates, transmit the contact coordinates to the processor 180, receive a command from the processor 180 and execute the command. In addition, the touch sensitive surface 131 may be implemented by multiple types, such as resistance-type, capacitance, infrared and surface acoustic waves. In addition to the touch sensitive surface 131, the input unit 130 may also include another input device 132. Specifically, the another input device 132 includes, but is not limited to, at least one of: a physical keyboard, a function key (such as, volume control button, on/off button), a trackball, a mouse, or a joystick.

The display unit 140 may be configured to display information inputted by a user, or information provided to a user, and various Graphic User Interfaces (GUIs) of the terminal 900. These GUIs may be consisted by any combination of graphic, text, icon, video. The display unit 140 may include a display panel 141. In some examples, the display panel 141 may be configured by some formats, such as Liquid Crystal Display (LCD), Organic Light-Emitting Diode (OLED). Furthermore, the touch sensitive surface 131 may overlay the display panel 141. When detecting a touch operation on or around the touch sensitive surface 131, the touch sensitive surface 131 transmits to the processor 180, so as to determine a type of the touch event. Subsequently, the processor 180 provides a corresponding visual output on the display panel 141, based on the type of the touch event. Although in FIG. 10, the touch sensitive surface 131 and display panel 141 are taken as two independent components to implement Input/Output (I/O) function, in some examples, the touch sensitive surface 131 and display panel 141 may be integrated, so as to implement the I/O function.

The terminal 900 may further include at least one kind of sensor 150, such as, a light sensor, a motion sensor, and other sensors. Specifically, the light sensor may include an ambient light sensor and a proximity sensor. The ambient light sensor may adjust brightness of the display panel 141, based on brightness of ambient light. When the terminal 900 moves to the ear, the proximity sensor may turn off the display panel 141, and/or, backlight. A gravity acceleration sensor, which is taken as one kind of motion sensor, may detect the magnitude of acceleration in all directions (usually three axes), detect the magnitude and direction of gravity when being static, which is available to an application for identifying a mobile phone gesture (such as, screen switch, a relevant game, a magnetometer gesture calibration), a vibration recognition related function (such as, pedometer, percussion), and so on. No repeated content is provided here for other sensors configurable for the terminal 900, such as, gyroscope, barometer, hygrometer, thermometer, infrared sensor.

The audio circuit 160, speaker 161 and microphone 162 may provide an audio interface, which is between a user and the terminal 900. The audio circuit 160 may transmit an electric signal to the speaker 161, in which the electric signal is obtained after converting the received audio data. Subsequently, the speaker 161 converts the electric signal into a sound signal, and outputs the sound signal. From another aspect, the microphone 162 converts the collected sound signal into an electric signal, which is received by the audio circuit 160 and converted into audio data. Subsequently, the audio circuit 160 outputs the audio data to the processor 180. After being processed by the processor 180, the audio data is transmitted to another terminal through the RF circuit 110, or is outputted to the memory 120 for further processing. The audio circuit 160 may further include an earphone jack, so as to provide communication between peripheral headphones and the terminal 900.

WiFi belongs to a short-range wireless transmission technology. Through the WiFi module 170, the terminal 900 may help a user to receive and transmit an e-mail, browse a webpage, access streaming media, and so on. The WiFi module 170 provides a wireless broadband Internet access for a user. Although FIG. 10 illustrates the WiFi module 170, it may be understood that, the WiFi module 170 is not a necessary component of the terminal 900, which may be omitted without changing the essence scope of the present disclosure, according to requirements.

The processor 180 is a control center of the terminal 900, which connects each component of the whole mobile phone through various interfaces and lines. By running the software programs, and/or modules stored in the memory 120, and calling data stored in the memory 120, the processor 180 executes each function of the terminal 900 and processes data, so as to monitor the phone as a whole. In some examples, the processor 180 may include one or more processing cores. Preferably, an application processor and a modem processor may be integrated into the processor 180. The application processor is mainly in charge of processing the OS, the user interface, applications, and so on. The modem processor is mainly responsible for processing wireless communication. It may be understood that, foregoing modem processor may be not integrated into the processor 180.

The terminal 900 may further include a source 190 (such as battery), which provides power for each component. Preferably, the source may connect with the processor 180 logically through a power management system, so as to implement functions, such as, manage charge, discharge, power consumption management, through the power management system. The source 190 may also include one or more direct current (DC) or alternating current (AC) power, recharge system, power failure detection circuit, inverter, power status indicator, or any component.

Although not shown, the terminal 900 may also include a camera, a Bluetooth module, and so on, which is not repeated here. Specifically, in the example, the display unit of the terminal 900 is a touch screen. The terminal 900 also includes a memory and one or more programs. The one or more programs are stored in the memory. After configuration, the one or more processors execute the one or more programs, which include instructions to:

transmit a service execution request to a service server;
receive a verification notification carrying signature information from the service server;
verify currently inputted biometric feature information through a TEE system; when the biometric feature information is consistent with pre-stored reference biometric feature information, perform a signature processing on the signature information, by using a pre-stored service private key, and obtain first to-be-verified signature information; and,
transmit a verification request carrying the first to-be-verified signature information to the service server.

In some examples, the method further includes:
generate a pair of device private key and device public key through the TEE system, store the device private key into the TEE system, transmit the device public key and device ID of the terminal to a device-public-key management server, such that the device-public-key management server stores the device ID corresponding to the device public key;
generate a pair of application private key and application public key through the TEE system, store the application private key into the TEE system, perform a signature processing on the application public key, by using the device private key, and obtain second to-be-verified signature information;
transmit a storing request carrying the device ID, the application public key and the second to-be-verified signature information to the service server;
generate a pair of service private key and service public key through the TEE system, store the service private key into the TEE system, perform a signature processing on the service public key, by using the application private key, and obtain third to-be-verified signature information; and,
transmit a storing request carrying the device ID, the service public key and the third to-be-verified signature information to the service server.

In some examples, the process of performing the signature processing on the signature information, by using the pre-stored service private key, and obtaining the first to-be-verified signature information includes:
performing the signature processing on the signature information and biometric feature information ID, by using the pre-stored service private key, so as to obtain the first to-be-verified signature information.

In some examples, the process of performing the signature processing on the signature information and biometric feature information ID, by using the pre-stored service private key, and obtaining the first to-be-verified signature information include:
performing the signature processing on the signature information, the biometric feature information ID, and terminal associated security information, by using the pre-stored service private key, and obtaining the first to-be-verified signature information, in which the terminal associated security information includes at least one of: a system ID, or a biometric identification component ID.

In the examples of the present disclosure, the service execution request is transmitted to the service server; the verification notification carrying signature information is received from the service server; the currently inputted biometric feature information is verified through the TEE system; when the biometric feature information is consistent with pre-stored reference biometric feature information, signature processing is performed on the signature information, by using the pre-stored service private key, and the first to-be-verified signature information is obtained; the verification request carrying the first to-be-verified signature information is transmitted to the service server. The service execution request is received from the terminal; the verification notification carrying signature information is transmitted to the terminal; when receiving the verification request carrying the first to-be-verified signature information from the terminal, based on pre-stored service public key and signature information, verification processing is performed on the first to-be-verified signature information. When the verification processing is successful, a service processing corresponding to the service execution request is performed; otherwise, execution of service processing is refused. Thus, after the verification processing for the to-be-verified signature information is passed, the service server may process the service, in which the to-be-verified signature information is obtained after the terminal performs signature processing by using the service private key. However, even if a hacker has cracked the terminal, the hacker cannot learn the service private key stored by the terminal in the TEE system, thereby enhancing security.

The present disclosure also provides a service server. FIG. 10 is a schematic diagram illustrating a structure of a service server, in accordance with an example of the present disclosure. A greater difference may be generated by the service server 1900, due to configuration or different performances. The service server 1900 may include one or more Central Processing Units (CPUs) 1922 (e.g., one or more processors), one or more memories 1932, one or more storage mediums 1930 (e.g., one or more mass storage devices) storing application program 1942 or data 1944. The memory 1932 and storage medium 1930 may be temporary storage or persistent storage. Programs stored in the storage medium 1930 may include one or more modules (not shown in the figure). Each module may include a series of instruction operations for the server. Furthermore, the CPU 1922 may be set to communicate with the storage medium 1930, and execute a series of instruction operations of the storage medium 1930 in the service server 1900.

The service server 1900 may also include one or more sources 1926, one or more wired or wireless network interfaces 1950, one or more I/O interfaces 1958, one or more keyboards 1956, and/or, one or more OS s 1941, e.g., Windows Server™, Mac OS X™, Unix™, Linux™, FreeBSD™, and so on.

The service server 1900 may include a memory, and one or more programs. The one or more programs are stored in the memory. After configuration, one or more processors execute the one or more programs, which include instructions to:
receive a service execution request from a terminal;
transmit a verification notification carrying signature information to the terminal;
when receiving a verification request carrying first to-be-verified signature information from the terminal, based on a pre-stored service public key and signature information, perform a verification processing on the first to-be-verified signature information, when the verification processing is successful, perform a service processing corresponding to the service execution request; otherwise, refuse to execute the service processing.

In some examples, the method further includes:
when receiving a storing request carrying a device ID, an application public key and second to-be-verified signature information from the terminal, obtaining a device public key corresponding to the device ID from a device-public-key management server, based on the device public key and application public key, performing a verification processing on the second to-be-verified signature information; when the verification processing is successful, storing the device ID corresponding to the application public key;
when receiving a storing request carrying the device ID, the service public key and third to-be-verified signature information from the terminal, based on the application public key corresponding to the stored device ID and the service public key, performing a verification processing on the third to-be-verified signature information, when the verification processing is successful, storing the service public key.

In some examples, the process of based on the pre-stored service public key and signature information, performing the verification processing on the first to-be-verified signature information, includes:
based on the pre-stored service public key, the signature information, and biometric feature information ID, performing the verification processing on the first to-be-verified signature information.

In some examples, the process of based on the pre-stored service public key, signature information and biometric feature information ID, performing the verification processing on the first to-be-verified signature information includes:
based on the pre-stored service public key, the signature information, the biometric feature information ID and terminal associated security information, performing the verification processing on the first to-be-verified signature information, in which the terminal associated security information includes at least one of: a system ID, a biometric identification component ID.

In the examples of the present disclosure, the service execution request is transmitted to the service server; the verification notification carrying signature information is received from the service server; currently inputted biometric feature information is verified through the TEE system; when the biometric feature information is consistent with pre-stored reference biometric feature information, based on the pre-stored service private key, signature processing is performed on the signature information, the first to-be-verified signature information is obtained, the verification request carrying the first to-be-verified signature information is transmitted to the service server. The service execution request is received from the terminal; the verification notification carrying signature information is transmitted to the terminal; when receiving the verification request carrying the first to-be-verified signature information from the terminal, based on the pre-stored service public key and signature information, verification processing is performed on the first to-be-verified signature information. When the verification processing is successful, service processing corresponding to the service execution request is performed; otherwise, execution of the service processing is refused. Thus, after the verification processing performed by the service server on the to-be-verified signature information is successful, the service may be processed, in which the to-be-verified signature information is obtained after the terminal performs signature processing by using the service private key. However, even if a hacker cracks the terminal, the hacker does not learn the service private key of the terminal stored in the TEE system, thereby enhancing security.

It should be noted that, in foregoing examples, when processing service by the service processing device, descriptions are only provided by dividing foregoing each functional module. In practical applications, foregoing functions may be allocated to different functional modules to be completed, based on requirements. That is, an internal structure of the device is divided into different functional modules, so as to complete all the functions, or some functions describe above. In addition, in foregoing examples, the service processing device and service processing method belong to the same concept. Regarding specific implementation processes about the service processing device, please refer to foregoing method examples, which are not repeated here.

Persons having ordinary skill in the art may understand that, all the blocks or some blocks of foregoing examples may be completed by hardware, or completed by related hardware instructed by a program. The program may be stored in a computer readable storage medium. The above-mentioned storage medium may be a Read-Only Memory (ROM), a disk, or a Compact Disk (CD), and so on.

The foregoing is only preferred examples of the present disclosure, which is not for use in limiting the scope of the present disclosure. Any equivalent change of structure or flow, which is made by using specification and attached figures of the present disclosure, should be covered by the protection scope of the present disclosure.

What is claimed is:

1. A service processing method, comprising:
   transmitting a service execution request to a service server;
   receiving a verification notification carrying signature information from the service server in correspondence with the service execution request;
   verifying currently inputted biometric feature information through a Trusted Execution Environment (TEE) system, responsive to determining that the currently inputted biometric feature information is consistent with pre-stored reference biometric feature information, performing a signature processing on the signature information by using a pre-stored service private key, and obtaining first to-be-verified signature information; and
   transmitting a verification request carrying the first to-be-verified signature information to the service server;
   wherein the method further comprises:
   generating a pair of a device private key and a device public key through the TEE system, storing the device private key into the TEE system, transmitting the device public key and a device ID of a terminal to a device-public-key management server, such that the device-public-key management server stores the device ID corresponding to the device public key;
   generating a pair of an application private key and an application public key through the TEE system, storing the application private key into the TEE system, performing a signature processing on the application public key, by using the device private key, and obtaining second to-be-verified signature information; and
   transmitting a storing request carrying the device ID, the application public key and the second to-be-verified signature information to the service server.

2. The method according to claim 1, further comprising:
   generating a pair of a service private key and a service public key through the TEE system, storing the service private key into the TEE system, performing a signature processing on the service public key, by using the application private key, and obtaining third to-be-verified signature information;
   transmitting a storing request carrying the device ID, the service public key and the third to-be-verified signature information to the service server.

3. The method according to claim 2, wherein performing the signature processing on the signature information and the biometric feature information ID comprises:
   performing the signature processing on the signature information, the biometric feature information ID, and terminal associated security information, wherein the terminal associated security information comprises at least one of a system ID, or a biometric identification component ID.

4. The method according to claim 1, wherein performing the signature processing on the signature information comprises:
   performing the signature processing on the signature information and a biometric feature information ID.

5. A service processing method, comprising:
   receiving a service execution request from a terminal;
   transmitting a verification notification carrying signature information to the terminal according to the service execution request, to cause the terminal generating first to-be-verified signature information;
   responsive to determining that a verification request carrying the first to-be-verified signature information is received from the terminal, performing a verification processing on the first to-be-verified signature information based on a pre-stored service public key and the signature information; and
   responsive to determining that the verification processing on the first to-be-verified signature information is successful, performing a service processing corresponding to the service execution request;
   wherein the method further comprises:
   receiving a storing request carrying a device ID, an application public key and second to-be-verified signature information from the terminal, wherein the terminal generates a pair of a device private key and a device public key through a Trusted Execution Environment (TEE) system, stores the device private key into the TEE system, transmits the device public key and the device ID of the terminal to a device-public-key management server, such that the device-public-key management server stores the device ID corresponding to the device public key; and, the terminal generates a pair of an application private key and the application public key through the TEE system, stores the application private key into the TEE system, performs a signature processing on the application public key, by using the device private key, and obtains the second to-be-verified signature information.

6. The method according to claim 5, further comprising:
   responsive to determining that the storing request carrying the device ID, the application public key and the second to-be-verified signature information is received from the terminal, obtaining the device public key corresponding to the device ID from the device-public-key management server, performing a verification processing on the second to-be-verified signature information based on the device public key and the application public key; and responsive to determining that the verification processing on the second to-be-verified signature information is successful, storing the device ID corresponding to the application public key.

7. The method according to claim 6, further comprising:
responsive to determining that a storing request carrying the device ID, the pre-stored service public key and third to-be-verified signature information is received from the terminal, performing a verification processing on the third to-be-verified signature information based on the application public key corresponding to the stored device ID and the pre-stored service public key; and responsive to determining that the verification processing on the third to-be-verified signature information is successful, storing the pre-stored service public key.

8. The method according to claim 5, wherein performing the verification processing on the first to-be-verified signature information based on the pre-stored service public key and the signature information comprises:
performing the verification processing on the first to-be-verified signature information based on the pre-stored service public key, the signature information and a biometric feature information ID.

9. The method according to claim 8, wherein performing the verification processing on the first to-be-verified signature information based on the pre-stored service public key, the signature information and the biometric feature information ID, comprises:
based on the pre-stored service public key, the signature information, the biometric feature information ID and terminal associated security information, performing the verification processing on the first to-be-verified signature information, wherein the terminal associated security information comprises at least one of a system ID, or a biometric identification component ID.

10. A terminal, comprising a processor and a memory, wherein the memory stores instructions that, when being executed by the processor, cause the processor to:
transmit a service execution request to a service server;
receive a verification notification carrying signature information from the service server in correspondence with the service execution request;
verify currently inputted biometric feature information through a Trusted Execution Environment (TEE) system, responsive to determining that the currently inputted biometric feature information is consistent with pre-stored reference biometric feature information, perform a signature processing on the signature information by using a pre-stored service private key, and obtain first to-be-verified signature information; and,
transmit a verification request carrying the first to-be-verified signature information to the service server;

wherein the instructions further cause the processor to:
generate a pair of a device private key and a device public key through the TEE system, store the device private key into the TEE system, transmit the device public key and a device ID of the terminal to a device-public-key management server, such that the device-public-key management server stores the device ID corresponding to the device public key;

generate a pair of an application private key and an application public key through the TEE system, store the application private key into the TEE system, perform a signature processing on the application public key, by using the device private key, and obtain second to-be-verified signature information; and transmit a storing request to the service server, wherein the storing request carries the device ID, the application public key and the second to-be-verified signature information.

11. The terminal according to claim 10, wherein the instructions further cause the processor to:
generate a pair of a service private key and a service public key through the TEE system, store the service private key into the TEE system, perform a signature processing on the service public key by using the application private key, and obtain third to-be-verified signature information;

transmit a storing request to the service server, wherein the storing request carries the device ID, the service public key and the third to-be-verified signature information.

12. The terminal according to claim 10, wherein the instructions further cause the processor to:
perform the signature processing on the signature information and a biometric feature information ID, by using the pre-stored service private key, and obtain the first to-be-verified signature information.

13. The terminal according to claim 12, wherein the instructions further cause the processor to:
perform the signature processing on the signature information, the biometric feature information ID and terminal associated security information, by using the pre-stored service private key, and obtain the first to-be-verified signature information, wherein the terminal associated security information comprises at least one of a system ID, a biometric identification component ID.

* * * * *